United States Patent
Taubert et al.

[11] 3,916,002
[45] Oct. 28, 1975

[54] OLIGOMERIC STEROID ESTERS, PROCESS FOR THEIR PRODUCTION, AND THERAPEUTIC COMPOSITIONS CONTAINING THE SAME

[76] Inventors: Hans-Dieter Taubert, Thorwaldsenstr. 32, Frankfurt am Main; Herbert Kuhl, Heymannstr. 12, Aschaffenburg, both of Germany

[22] Filed: Dec. 17, 1973

[21] Appl. No.: 425,623

[52] U.S. Cl. ............ 260/397.4; 260/397.5; 424/241
[51] Int. Cl.² ............................................. C07J 1/00
[58] Field of Search............ 260/397.4, 397.5, 397.3

[56] References Cited
UNITED STATES PATENTS
3,147,183  9/1964  Heider et al........................ 167/58

*Primary Examiner*—Elbert L. Roberts
*Attorney, Agent, or Firm*—Michael S. Striker

[57] ABSTRACT
Oligomeric steroid esters having the formula $$R-O-CO-(CH_2)_n-CO-O-R$$

in which $n$ is an integer from 2 to 8 and each R is a monovalent steroid radical of the group consisting of steroid radicals derived from steroids having a hydroxyl substituent at one of the carbon atoms numbered 3, 16 or 17, the said steroid radical being joined to the oxy radical in the formula directly by one of the carbon atoms numbered 3, 16 or 17 from which the hydroxyl radical has been eliminated and radicals having the formula $$R-O-CO-(CH_2)_n-CO-O-$$

in which $n$ and R have the same significance as hereinbefore, the said steroid ester containing at most six of the said R radicals. The oligomeric steroid esters when injected in the form of an injectable therapeutic composition have a depot or repository effect, that is, they provide a longer period of steroid activity than do the simple steroid compounds from which they are formed. Processes of producing the oligomeric steroid esters and therapeutic compositions containing these oligomeric steroid esters are also disclosed.

18 Claims, No Drawings

OLIGOMERIC STEROID ESTERS, PROCESS FOR THEIR PRODUCTION, AND THERAPEUTIC COMPOSITIONS CONTAINING THE SAME

BACKGROUND OF THE INVENTION

Heretofore, in order to produce therapeutic compositions containing steroid hormones that would have a depot or repository effect when administered, steroid alcohols have been combined with long-chain fatty acids to produce esters such as the 17-undecenoate of estradiol that is disclosed in U.S. Pat. No. 2,990,414. Steroids have also been modified by the introduction of other substituents, for example, by replacing the hydroxyl on the carbon atom numbered 3 of the steroid with a cyclopentoxy radical to produce an ether. The compounds that were thus formed were more or less lipophilic.

Water-soluble polysteroid phosphates having such a depot effect were also described in U.S. Pat. No. 2,928,849 and in a publication by E. R. Diczfalusy in Endocrinology, vol. 54, page 471 (1954).

The production of steroid esters containing two steroid nuclei has been described heretofore only in connection with steroids of the pregnane series in which only the hydroxyl substituent on the carbon atom numbered 21 of the corticosteroid was esterified. In U.S. Pat. No. 2,999,102, a procedure is described in which the esterification of a 21-hydroxy-substituted steroid is effected by reaction with an acid chloride of a dicarboxylic acid in solution in a mixture of dioxane and pyridine. Similar corticosteroid esters containing two nuclei are also described in French Pat. No. 1,167,928 in which the esterification was effected only at the hydroxyl substituent at the carbon atom numbered 21 by reacting the corresponding 21-bromine derivative with the sodium, potassium or lithium salt of the succinic acid monoester of the corresponding 21-hydroxy corticosteroid.

Succinic acid esters of hydrocortisone (11 β, 17α, 2-1-trihydroxy-4-pregnene13,20-dione) and derivatives thereof in which the hydroxyl radical at the carbon atom numbered 21 of the steroid was esterified have been synthesized by R. Joly et al. (Chem. Abs., vol. 55 (1961), page 531g) but none of the methods that were used in the synthesis of those esters are applicable to the production of the novel oligomeric esters of the present invention.

SUMMARY OF THE INVENTION

The present invention pertains to novel compounds which are oligomeric esters of steroids and which have a much longer period of therapeutic effectiveness in comparison with the known androgenic, estrogenic, and gestogenic hormones and their derivatives from which they are formed.

These esters, which are represented by the formula

are formed and can be produced by esterification of each of the two carboxyl radicals of a dicarboxylic acid with a steroid alcohol having a hydroxyl radical substituent at carbon atoms numbered 3, 16 or 17. In this formula n is an integer from 2 to 8 and each R is a monovalent steroid radical derived from steroids having a hydroxyl substituent at one of the carbon atoms numbered 3, 16 or 17, the said steroid radical being joined to the oxy radical in the formula directly by one of the carbon atoms numbered 3, 16 or 17 from which the hydroxyl radical has been eliminated, and radicals having the formula

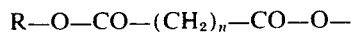

in which n and R have the same significance as hereinbefore, the said steroid ester containing at most six of the said R radicals.

Each of the monovalent R radicals may be a radical of the group consisting of 4-estren-3-yl having the formula

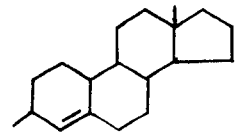

4-estren-17-yl having the formula

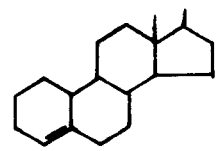

1,3,5(10)-estratrien-3-yl having the formula

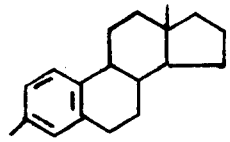

1,3,5(10)-estratrien-16-yl having the formula

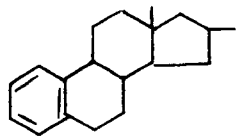

1,3,5(10)-estratrien-17-yl having the formula

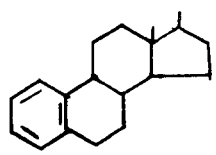

androstan-3-yl having the formula

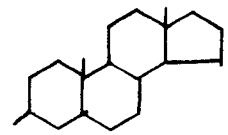

androstan-16-yl having the formula

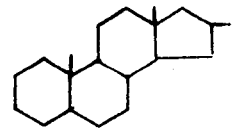

androstan-17-yl having the formula

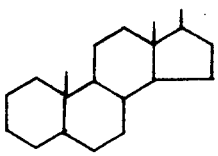

1-androsten-3-yl having the formula

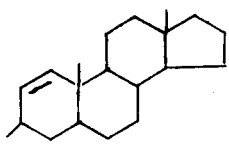

1-androsten-17-yl having the formula

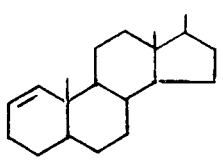

4-androsten-3-yl having the formula

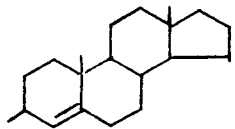

4-androsten-17-yl having the formula

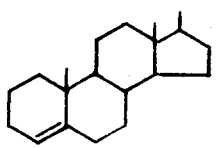

and 1,4-androstandien-16-yl having the formula

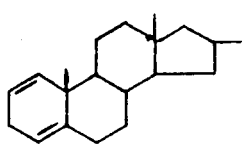

Each of the R radicals furthermore may be substituted in one or more of the carbon atoms numbered 1, 3, 16 or 17 that are otherwise available, as well as at one or more of the carbon atoms numbered 2, 4, 5, 6, 7, 8, 9, 10, 11, 12, 13, 14, 15, 18 or 19 with a radical of the group including hydroxy, oxo, alkyl containing up to 4 carbon atoms, such as methyl and ethyl, alkenyl and alkynyl containing up to 4 carbon atoms, such as vinyl and ethynyl, alkoxy containing up to 4 carbon atoms, such as methoxy, and acyloxy containing up to 12 carbon atoms, such as benzoyloxy and alkanoyloxy radicals such as the acetoxy radical.

Especially useful esters are those in which the radicals R are the 17α-ethynyl-17β-hydroxy-4-estren-3β-yl, 3-oxo-4-estren-17β-yl, 17β-acetoxy-1,3,5(10)-estratrien-3-yl, 17β-hydroxy-1,3,5(10)-estratrien-3-yl, 3-acetoxy-1,3,5(10)-estratrien-17β-yl, and 3-oxo-4-androsten-17β-yl.

The dicarboxylic acid from which the esters of the present invention are produced is preferably succinic acid in which the n of the foregoing formula is 2, but the esters may also be produced from other dicarboxylic acids such as glutaric acid (pentanedioic acid), adipic acid (hexanedioic acid), pimelic acid (heptanedioic acid), suberic acid (octanedioic acid), azelaic acid (non-anedioic acid) and sebacic acid (decanedioic acid).

The esters of the present invention having the foregoing formula may be advantageously made by esterification of a monoester of a dicarboxylic acid and a steroid alcohol having the formula $$R-O-CO-(CH_2)_n-COOH$$

with a steroid alcohol having the formula $$R-OH$$

in both of which formulae R has the same significance as specified hereinbefore.

Reactive functional derivatives such as the sodium salt or salts of other metals, as well as the corresponding acyl chlorides of the monoester of the dicarboxylic acid, may be used instead of the monoester. Instead of the steroid alcohol R—OH, reactive functional derivatives such as the bromide or the paratoluenesulfonate esters thereof may be substituted therefor. If necessary, an esterification catalyst such as, for example, hydrochloric acid or a dehydrating agent, may be used to effect the esterification.

An especially preferred procedure for effecting the esterification of the monoester of the dicarboxylic acid consists in using N,N'-carbonyldiimidazole as the dehydrating agent. The reaction can advantageously be carried out in an inert anhydrous organic solvent, such as tetrahydrofuran, benzene, dimethylformamide or chloroform, and proceeds with the formation of imidazole (1,3-diazole) and carbon dioxide and an intermediate imidazolide of the monoester of the dicarboxylic acid which is then reacted with the steroid alcohol to produce the desired steroid diester of the dicarboxylic acid.

The reaction proceeds at room temperature and is complete in several days but it may be speeded to completion in a correspondingly shorter period by heating at a higher temperature. The reaction can also be speeded if necessary by using catalytic quantities of a metal alcoholate or phenolate of the steroid alcohol such as the sodium alcoholate or phenolate having the formula R-ONa or the sodium salt of the imidazole. The proportions of the reactants influence only the yields of the desired ester.

In this reaction, in which the monoester of the dicarboxylic acid and steroid alcohol is esterified with a steroid alcohol with N,N'-carbonyldiimidazole as a dehydrating or water-cleaving agent, a wide range of reactants may be used. It is advantageous to react the N,N'-carbonyldiimidazole with the carboxyl group of the monoester before the steroid alcohol is added, so as to thereby avoid substantially the occurrence of undesirable side reactions, for example, the formation of esters of carbonic acid and the steroid alcohol. Transesterification reactions in which the imidazole that is formed in the reaction participates, which also results in the production of by-products, occur when the reaction temperature is increased. This is illustrated in Example 3 hereinafter in which at least three products are formed in the reaction.

This general process is especially adapted, by use of suitable steroid alcohols, for the stepwise formation of compounds consisting of oligomers or long chains of steroid nuclei or radicals. It is also quite suitable for the production of compounds consisting of a combination of different steroids, that is, compounds which include a combination of several different steroid radicals or nuclei.

1,3,5(10)-estratriene-17β-yl)ester can then be reacted with a further quantity of N,N'-carbonyldiimidazole to produce an imidazolide which can then be reacted with a further quantity of a steroid alcohol to produce the larger oligomeric steroid esters of the present invention.

The invention is described in greater detail in the Examples which follow, which Examples were selected solely for purposes of illustration and are not to be regarded as limiting the invention thereto.

EXAMPLE 1

Preparation of succinic acid mono(17β-hydroxy-1,3,5(10)-estratrien-3-yl)ester-mono(3-acetoxy-1,3,5(10)-estratrien-17β-yl)ester having the formula

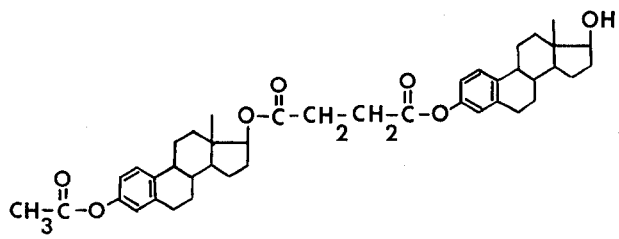

DETAILED DESCRIPTION

The starting compounds which are monoesters of dicarboxylic acids and steroid alcohols having the formula R—O—CO—(CH$_2$)$_n$—COOH, such as the monoester of succinic acid and 3-acetoxy 1,3,41,3,510)-estratrien-17β-ol that is referred to herein also as succinic acid mono(3-acetoxy-1,3,5(10)estratien-17β-yl)ester, that are required for the preparation of the oligomeric steroid esters of the present invention can be prepared by conventional esterification procedures, namely be reacting the dicarboxylic acid with the steroid alcohol in the presence of an esterification catalyst, if necessary. However, they are preferably prepared by reaction of a dicarboxylic acid such as succinic acid and adipic acid with N,N'-dicarbonyldiimidazole and subsequent esterification of the resulting carboxylic acid imidazolide with a steroid alcohol such as 3-acetoxy-1,3,5(10)-estratrien-17β-ol in accordance with the general procedure described by H. S. Staab and A. Mannschreck in Chem. Ber., vol. 95, pages 1284 et seq. (1962). Since both the imidazolide and N,N'-dicarbonyldiimidazole react vehemently with water the reaction must be conducted in an inert anhydrous solvent such as tetrahydrofuran, benzene, dimethylformamide or chloroform. Thus, for the preparation of the succinic acid mono(3-acetoxy-1,3,5(10)-estratrien-17β-yl)ester, equimolecular proportions of N,N'-carbonyldiimidazole and succinic acid are reacted together in tetrahydrofuran, for example, with the formation of the succinic acid imidazolide, imidazole (1,3-diazole), and carbon dioxide. This succinic acid imidazolide is then used to esterify the 17β-hydroxyl radical of the 3-acetoxy-1,3,5(10)-estratrien-17β-ol. The resulting succinic acid mono(3-acetoxy- Four grams (approximately 10 millimols) of succinic acid mono(3-acetoxy-1,3,5(10)-estradien-17β-yl)-ester prepared from 1,3,5(10)-estratriene-3,17β-diol and succinic acid anhydride to which later acetic acid anhydride was added in accordance with the general procedure described hereinbefore and 3 grams (approximately 18.5 millimols) of N,N'-carbonyldiimidazole were dissolved in 80 milliliters of anhydrous tetrahydrofuran and the solution was allowed to stand at room temperature for a period of 10 hours. After the addition of 12 grams (approximately 44 millimols) of estradiol (1,3,5(10)-estratriene-3,17β-diol) to the solution it was allowed to stand at room temperature for 3 days and then heated under gentle reflux for 1 hour. The solution was then cooled and poured into 500 milliliters of water. Ethyl acetate was then added to the resulting solution and shaken therewith and the ethyl acetate extract was then separated from the aqueous phase of the mixture, washed with water, dried by contact with anhydrous sodium sulfate and evaporated to dryness. The dry residue was dissolved in chloroform and separated chromatographically into fractions on a silica gel column and the crude succinic acid mono(17β-hydroxy-1,3,5(10)-estratrien-3-yl)ester-mono(3-acetoxy-1,3,5(10)-estratrien-17β-yl)ester having the foregoing formula that was thus obtained was recrystallized from cyclohexane and the recrystallized compound had a melting point of 186°–187°C. The compound was further identified by its elemental analysis (C$_{42}$H$_{52}$O$_7$) and infrared and nuclear-magneticresonance spectra.

EXAMPLE 2

Preparation of succinic acid mono(3-acetoxy-1,3,5-(10)-estratrien-17β-yl)ester-mono(17β-acetoxy-1,3,5(10)-estratrien-3-yl)ester having the formula

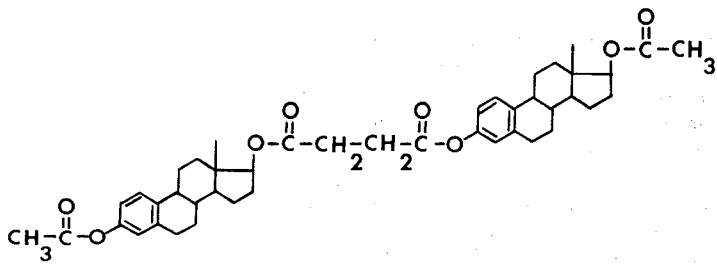

By substituting an equivalent amount of estradiol-17-acetate (3-hydroxy-17β-acetoxy-1,3,5(10)-estratriene for the estradiol in Example 1 and proceeding as otherwise described therein, the succinic acid mono(3-acetoxy-1,3,5(10)-estratrien-17β-yl)ester-mono(17β-acetoxy-1,3,5(10)-estratrien-3β-yl(ester, having the foregoing formula was obtained. It had a melting point of 105°–110°C and was further identified by its elemental analysis ($C_{44}H_{54}O_8$) and infrared and nuclear-magnetic resonance spectra.

EXAMPLE 3

Preparation of (1) succinic acid di(3-acetoxy-1,3,5(10)-estratrien-17β-yl)ester, (2) 3,17β-bis[3-(3-acetoxy-1,3,5(10)-estratrien-17β-yl-oxycarbonyl)propionyloxy]-1,3,5(10)-estratriene, and (3) succinic acid di{3-[3-(3-acetoxy-1,3,5(10)-estratrien-17β-yl)-oxycarbonyl-propionyloxy]-1,3,5(10)-estratrien-17β-yl} ester having the formulae:

N,N′-carbonyldiimidazole were dissolved in 60 milliliters of anhydrous tetrahydrofuran. After the carbon dioxide that had formed was expelled, the solution was heated under gentle reflux for one hour. Thereafter a solution of 1.5 grams (approximately 5.6 millimols) of estradiol (1,3,5(10)-estratrien-3,17β-diol) in 20 milliliters of anhydrous tetrahydrofuran was added in small increments from a dropping funnel to the reaction mixture and, after 2 hours of further heating under gentle reflux, the mixture was allowed to stand overnight at room temperature and was then poured into 500 milliliters of water. Chloroform was then added and the mixture was then shaken, after which the chloroform extract was separated from the aqueous phase, washed with water, dried in contact with anhydrous sodium sulfate and evaporated to dryness. The dry residue was redissolved in chloroform and the solution was separated chromatographically into fractions in a silica gel column.

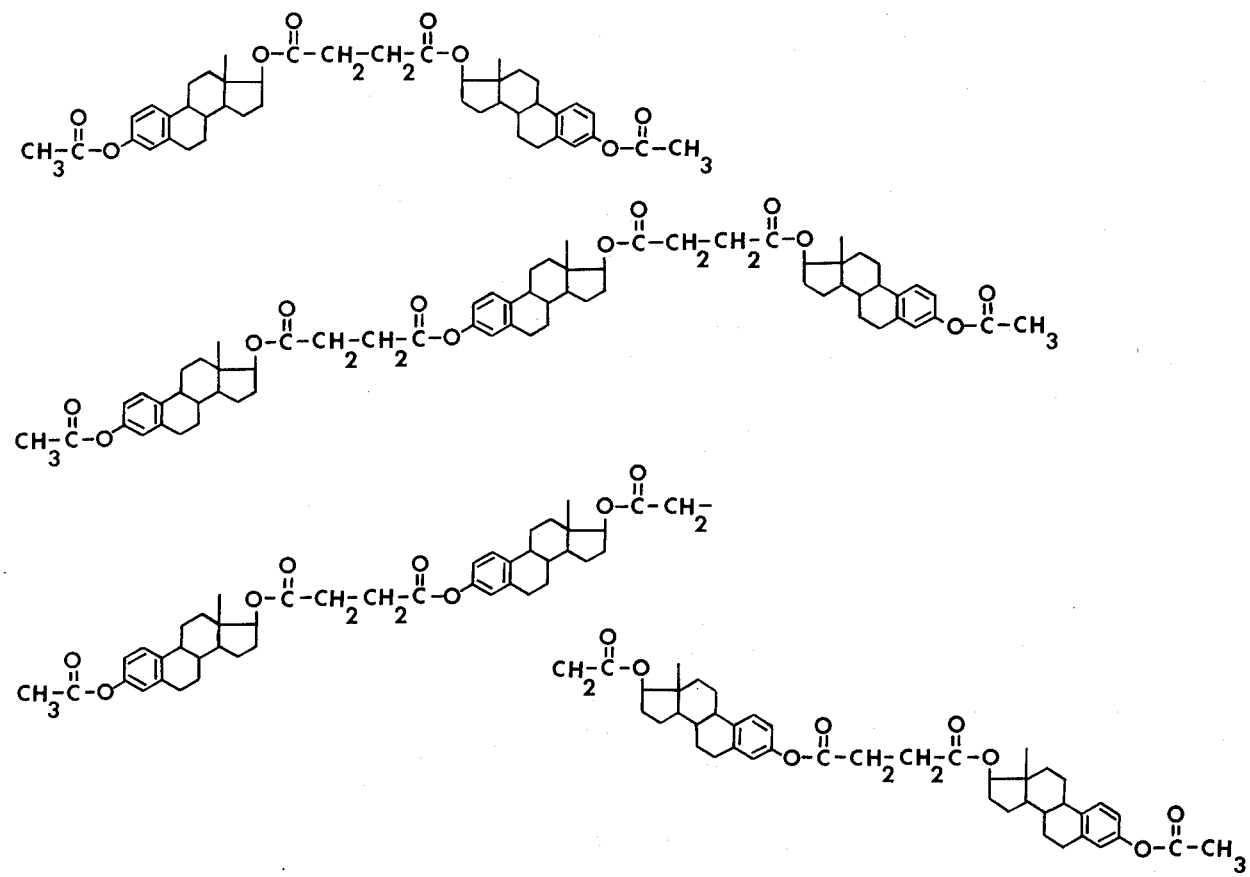

Twelve grams (approximately 29 millimols) of succinic acid mono(3-acetoxy-1,3,5(10)-estratrien-17β-yl)-ester and 4.8 grams (approximately 30 millimols) of The fractions that were first eluted, which contained oligomeric succinic acid esters of estradiol derivatives were combined and evaporated to dryness and again separated on a silica gel chromatographic column with a mixture consisting of 9 parts by volume of cyclohexane and 0.5 part by volume of each of chloroform and glacial acetic acid. The three oligomeric esters that are listed hereinafter were eluted from the column in the sequence indicated. Each of the fractions containing these esters was evaporated to dryness, and the dry residue was washed with water to remove any residual acetic acid and the ester was crystallized from a mixture of acetone and methanol.

The middle fraction of the first elution of the column with chloroform, containing the same succinic acid mono(3-acetoxy-1,3,5(10)-estratrien-17β-yl)estermono(17β-hydroxy-1,3,5(10)-estratrien-3-yl)ester that was prepared in Example 1 was evaporated and the residue redissolved in cyclohexane and the ester recrystallized from the resulting solution.

The other three oligomeric esters that were obtained, in the order of their elution from the column, were the following:

3,17β-Bis[3-(3-acetoxy-1,3,5(10)-estratrien-17β-yl-oxycarbonyl)propionyloxy]-1,3,5(10)-estratriene; melting point 115°–120°C (compound 2). Succinic acid di(3-acetoxy-1,3,5(10)-estratrien-17β-yl)ester, melting point 164°C (compound 1). Succinic acid di{3-[3-(3-acetoxy-1,3,5(10)-estratrien-17β-yl)-oxycarbonyl-propionyloxy]-1,3,5(10)-estratrien-17β-yl}ester; melting point 125°–135°C (compound 3).

The foregoing compounds were also identified by elemental analysis (formulae $C_{66}H_{80}O_{12}$, $C_{44}H_{54}O_8$ and $C_{88}H_{106}O_{16}$, respectively) and infrared and nuclear magnetic-resonance spectra.

EXAMPLE 4

Preparation of succinic acid di(17α-ethynyl-17β-hydroxy-4-estren-3β-yl)ester having the formula

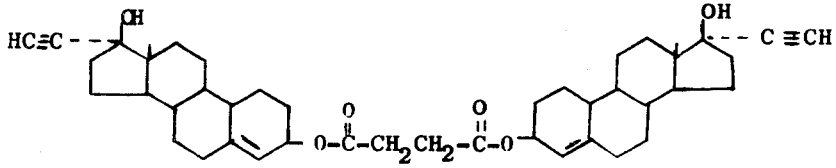

Three grams of succinic acid mono(17β-ethynyl-17β-hydroxy-4-estren-3-β-yl)ester that was prepared by esterification of succinic acid imidazolide with ethynodiol, which is also known as 17α-ethynyl-4-estrene-3β, 17β-diol and 19-nor-17α-pregn-4-en-20-yne-3β,17β-diol, in accordance with the general procedure described hereinbefore, and 1.7 grams of N,N'-carbonyldiimidazole were dissolved in 50 milliliters of tetrahydrofuran and the solution was allowed to stand overnight at room temperature. Thereafter 6 grams of ethynodiol was added to the solution and the solution was allowed to stand for 5 days at room temperature. Subsequently the solution was poured with stirring into 1 liter of water, chloroform was added and the mixture was shaken. The chloroform extract was then separated from the aqueous phase, washed with water, dried by contact with anhydrous sodium sulfate, and evaporated to dryness. The dry residue was dissolved in a mixture of 9 parts by volume of chloroform and 1 part by volume of acetone and the solution was separated into fractions chromatographically in a silica gel column. The crude compound was recrystallized from cyclohexane and the thus-purified product, which had the foregoing formula, had a melting point of 161°–163°C.

EXAMPLE 5 preparation of succinic acid di(3-oxo-4-estren-17β-yl)ester having the formula

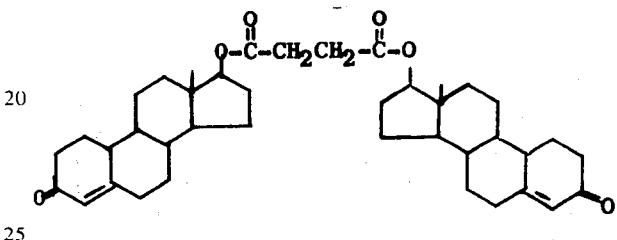

By substituting an equivalent amount of succinic aciid mono(19-nortestosteron-17β-yl)ester, prepared by esterification of succinic acid imidazolide with 19-nortestosterone in accordance with the general procedure described hereinbefore for the succinic acid mono(17-α-ethynyl-17β-hydroxy-4-estren-3β-yl)ester, and 19-nortestosterone for the 17α-ethynyl-4-estrene-3β,17β-diol) in Example 4, and proceeding analogously to the method described therein, succinic acid di(3-oxo-4-estren-17β-yl)ester having the foregoing formula was obtained.

EXAMPLE 6

Preparation of succinic acid di(3-oxo-4-androsten-17β-yl)ester having the formula

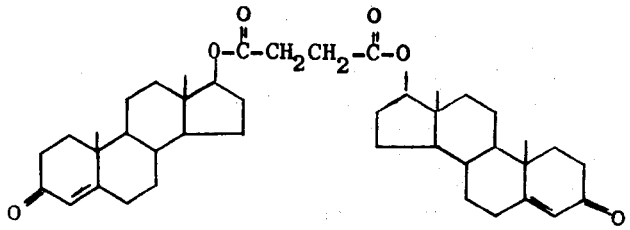

By substituting an equivalent amount of succinic acid mono(testesteron-17β-yl)ester prepared by esterification of succinic acid imidazolide with testosterone (17β-hydroxy-4-androsten-3-one) in accordance with the general procedure described hereinbefore for the succinic acid mono(17α-ethynyl-17β-hydroxy-4-estren-3β-yl)ester, and testosterone for the 17α-ethynyl-4-estrene-3β,17β-diol in Example 4 and proceeding analogously to the method described therein, succinic acid di(3-oxo-4-androsten-17β-yl)ester having the foregoing formula was obtained.

EXAMPLE 7

Preparation of adipic acid mono(3-oxo-4-androsten-17β-yl)ester-mono(3-oxo-4-estren-17β-yl)ester having the formula

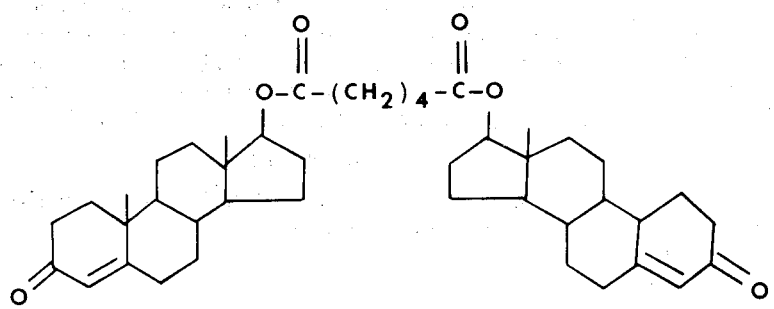

By substituting an equivalent amount of adipic acid mono(testesteron-17β-yl)ester, prepared by esterification of adipic acid imidazolide with testosterone in accordance with the general procedure described hereinbefore for the succinic acid mono(19-nortestosterone-17β-yl)ester in Example 5, and proceeding analogously to the method described therein, adipic acid mono(3-oxo-4-androsten-17β-yl)ester-mono(3-oxo-4-estren-17β-yl)ester having the foregoing formula was obtained.

EXAMPLE 8

Preparation of succinic acid mono(3-acetoxy-1,3,5(10)-estratrien-17β-yl)ester-mono(17α-ethynyl-17β-hydroxy-4-estren-3β-yl)ester having the formula

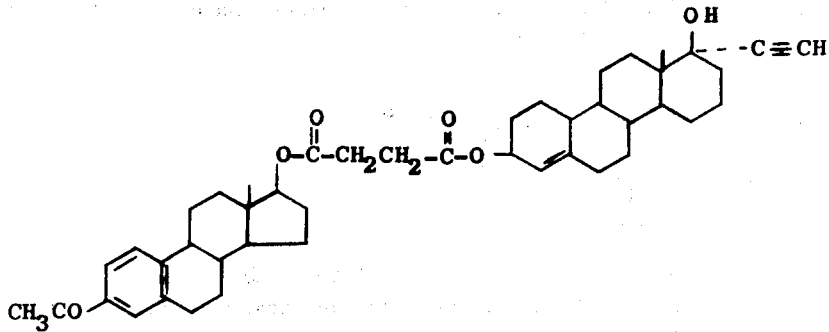

One grams of succinic acid mono(3-acetoxy-1,3,5(10)-estradien-17β-yl)ester and 0.4 gram of N,N'-carbonyldiimidazole were dissolved in 15 milliliters of anhydrous tetrahydrofuran and allowed to stand overnight at room temperature. Thereafter 3 grams of ethynodiol (19-nor-17α-pregn-4-en-2-yne-3β,17β-diol) was added to the solution and the resulting solution was allowed to stand for 3 days at room temperature. Subsequently the solution was heated under gentle reflux for 3 hours and, after cooling, it was poured into 100 milliliters of water. Chloroform was then added to the solution and the mixture was shaken. The chloroform extract was then separated from the aqueous phase, washed with water, dried by contact with anhydrous sodium sulfate and evaporated to dryness, the dry residue was dissolved in a mixture of 9 parts by volume of cyclohexane and 0.5 part by volume of each of chloroform and glacial acetic acid and separated chromatographically into fractions in a silicon gel column. The eluted fraction containing the crude succinic acid mono(3-acetoxy- 1,3,5(10)-estratrien-17β-yl)ester-mono(17α-ethynyl-17β-hydroxy-4-estren-3β-yl)ester was then evaporated to dryness and the residue was dissolved and recrystallized from a mixture of acetone and methanol. The product thus obtained, which had the foregoing formula, had a melting point of 95°–99°C.

UTILITY OF THE COMPOUNDS

The novel oligomeric steroid esters of the present invention can be incorporated into or combined with carriers, excipients, and vehicles that are used to produce therapeutic compositions for use in human and veterinary medicine. Carriers or vehicles that are suitable for the preparation of such therapeutic compositions which are adapted for oral and parenteral (subcutaneous, intravenous, intramuscular and intrathecal, for example) administration, or topical application, include organic and inorganic substances which are compatible with and do not react with the new oligomeric steroid esters, such as water, vegetable oils, polyethylene glycols, gelatin, lactose, starch, magnesium stearate, talc, petrolatum and cholesterol. Oily or aqueous solutions, as well as suspensions and emulsions, are especially useful for parenteral administration. For oral administration, tablets, capsules or sugar-coated pills are suitable, whereas, for topical application, salves or creams, which are sterilized, if necessary, or are mixed with adjuvants, such as preservatives, stabilizers, and wetting agents, or salts which influence the osmotic pressure, or buffering subtances, may be used. The novel oligomeric steroid esters of the present invention are well suited for percutaneous application in the form of a solution in oil with an intracutaneous injector.

The estrogenic activity of certain of the oligomeric steroid esters of the present invention was determined by means of the Allen-Doisy Test that is described in the book by M. X. Zarrow, J. M. Yochim and J. L. McCarthy, entitled "Experimental Endocrinology" published 1964 by Academic Press, New York, page 41, et seq., using rats having a body weight between 200 and 250 grams. Groups of 15 to 20 oophorectomized rats each received a single subcutaneous injection of 40 micrograms of the compound dissolved in 0.5 milliliter of a mixture of 6 parts by volume of peanut oil and 4 parts by volume of benzyl benzoate. Vaginal smears were then taken daily to determine the duration of the estrogenic effect. The results of these tests of each of the compounds that were tested are included in the following Table:

| Compound | Duration of Estrogenic Effect (in days) |
| --- | --- |
| Estradiol 17β-diacetate | 23 |
| Compound of Example 1 | 70 |
| Compound of Example 2 | 87 |
| Compound 1 of Example 3 | 98 |
| Compound 2 of Example 3 | 120 |
| Estradiol 17β-undecenoate | 87 |

In comparison with the polyestradiol phosphate that is disclosed in Diczfalusy et al., U.S. Pat. No. 2,928,849, the estrogenic effect of the compound of Examples 1 and 2 and compounds 1 and 2 of Example 3 in this test were surprisingly of a much longer duration.

Compound 3 of Example 3, which includes four 1,3,5(10)-estratrien-17-yl radicals or nuclei had an equally long duration of estrogenic effect.

The contraceptive or antiestrogenic effectiveness of the compound of Example 4, which contains two 17β-ethynyl-4-estren-3β-yl radicals or nuclei was similarly longer than the duration of the effectiveness of the parent steroid alcohol in the antiestrogen test that was performed on rats in accordance with the method described in the book by K. Junkmann, entitled "Handbuch der experimentallen Pharmokologie, Die Gestagene," published 1968 by Springer Verlag, Berlin, pages 757a et seq.

To be effective, the oligomeric steroid esters of the present invention must be administered in a sufficiently large dose so that the compound has an opportunity to break down or hydrolyze into the individual steroid nuclei or molecules of which it is composed, which are the effective agents. In the Allen-Doisy test, small doses consisting of 5 or 10 micrograms of compound 2 of Example 3, for example, produced no estrogenic effect and doses up to 20 micrograms are also ineffective or only slightly effective. Each compound has a specific minimum dosage at which its depot or repository effect is obtained. The effect of different dosages on the duration of the depot effect of the compound of Example 1 as determined in rats in accordance with the Allen-Doisy Test is illustrated in the following results:

| Dosage (in micrograms) | Duration of Estrogenic Effect (in days) |
| --- | --- |
| 20 | 41 |
| 40 | 65 |
| 80 | 82 |

In the case of the compound of Example 4, which is a gestogen, a dose of 40,000 micrograms was effective for 80 days in the antiestrogen test that was referred to hereinbefore. The androgenic effectiveness of the compound of example 6 which contains two 3-oxo-4-androsten-17β-yl radicals or nuclei lasted longer than 108 days when castrated male rats were injected with 10 mg. of the said compound and the weight of the prostate gland and of the seminal vesicles was determined in groups of rats at varying time intervals after the injection in accordance with the method described in the book by M. X. Zarrow, J. M. Yochim, and J. L. McCarthy, entitled "Experimental Endrocrinology," published in 1964 by Academic Press, New York, page 139, et seq. After 108 days, these organ weights of the animals treated with the said compound were found to be twice as high as that of control animals which had been treated for comparison with an equal amount of 3-oxo-4-androsten-17β-emanthate.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An oligomeric steroid ester having the formula
R—O—CH—(CH$_2$)$_n$—CO—O—R
in which $n$ is an integer from 2 to 8 and R is a steroid radical of the group consisting of 4-estren-3-yl, 4-estren-17-yl, 1,3,5(10)-estratrien-3-yl, 1,3,5(10)-estratrien-16-yl, 1,3,5(10)-estratrien-17-yl, androstan-3-yl, androstan-16-yl, androstan-17-yl, 1-androsten-3-yl, 1-androsten-17-yl, 4-androsten-3-yl, 4-androsten-17-yl, 1,4-androstanedien-16-yl, 17α-ethynyl-17β-hydroxy-4-estren-3-yl, 3-oxo-4-estren-17β-yl, 17β-acetoxy-1,3,5(10)-estratrien-3-yl, 17β-hydroxy-1,3,5(10)-estratrien-3-yl, 3-acetoxy-1,3,5(10)-estratrien-17β-yl, and 3-oxo-4-androsten-17β-yl radicals and radicals having the formula
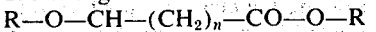
R—O—CO—(CH$_2$)$_n$—CO—O—
in which $n$ and R have the same significance as hereinbefore, the said steroid ester containing at most six of the said R radicals.

2. An oligomeric steroid ester as defined in claim 1 which is succinic acid mono(17β-hydroxy-1,3,5(10)-estratrien-3-yl)ester-mono(3-acetoxy-1,3,5(10)-estratrien-17β-yl)ester.

3. An oligomeric steroid ester as defined in claim 1 which is succinic acid mono(3-acetoxy-1,3,5(10)-estratrien-17β-yl)ester-mono(17β-acetoxy-1,3,5(10)-estratrien-3β-yl)ester.

4. An oligomeric steroid ester as defined in claim 1 which is succinic acid di(3-acetoxy-1,3,5(10)-estratrien-17β-yl)ester.

5. An oligomeric steroid ester as defined in claim 1 which is 3,17β-bis[3-(3-acetoxy-1,3,5(10)-estra-17β-yl-oxycarbonyl)propionyloxy]-1,3,5(10)-estratriene.

6. An oligomeric steroid ester as defined in claim 1 which is succinic acid di{3-[3-(3-acetoxy-1,3,5(10)-estratrien-17β-yl)-oxycarbonyl-propionyloxy]-1,3,5(10)-estratrien-17β-yl}ester.

7. An oligmeric steroid ester as defined in claim 1 which is succinic acid di(17α-ethynyl-17β-hydroxy-4-estren-3β-yl)ester.

8. An oligomeric steroid ester as defined in claim 1 which is succinic acid di(3-oxo-4-estren-17β-yl)-ester.

9. An oligomeric steroid ester as defined in claim 1 which is succinic acid di(3-oxo-4-androsten-17β-yl)ester.

10. An oligomeric steroid ester as defined in claim 1 which is adipic acid mono(3-oxo-4-androsten-17β-yl)ester-mono(3-oxo-4-estren-17β-yl)ester.

11. An oligomeric steroid ester as defined in claim 1 which is succinic acid mono(3-acetoxy-1,3,5(10)-estratrien-17β-yl)ester-mono(17α-ethynyl-17β-hydroxy-4-estren-3β-yl) ester.

12. A process for the production of an oligomeric steroid ester as defined in claim 1 which comprises esterifying a monoester of a dicarboxylic acid having the formula $$R-O-CO-(CH_2)_n-COOH$$

in which n and R have the same significance as in claim 1 with a steroid alcohol having the formula R—OH in which R has the same significance as in claim 1, by mixing the said monoester of a dicarboxylic acid or a reactive functional derivative thereof with the said steroid alcohol or a reactive functional derivative thereof and subsequently recovering the resulting oligomeric steroid ester.

13. A process as defined in claim 12 in which the esterification is conducted in the presence of an esterification catalyst at a temperature sufficient to produce gentle reflux.

14. A process as defined in claim 12 in which the esterification is effected by first mixing the monoester of a dicarboxylic acid in an inert anhydrous organic solvent therefor with an amount of N,N'-carbonyldiimidazole that is at least stoichiometrically sufficient to convert the monoester to an imidazolide and allowing the solution to stand until substantially all of the monoester is converted to the imidazolide, subsequently adding the steroid alcohol to the said solution and allowing the mixture to stand until substantially all of the imidazolide is converted to the oligomeric steroid ester and subsequently pouring the reaction mixture into water and recovering the oligomeric ester from the resulting mixture.

15. A process as defined in claim 12 in which the solution after the addition of the steroid alcohol and standing is heated at a temperature sufficient to produce a gentle reflux before being poured into water.

16. A process as defined in claim 14 in which the oligomeric steroid ester is recovered by extraction of the mixture with a water-immiscible organic solvent for the oligomeric steroid ester.

17. A process as defined in claim 15 in which the water-immiscible organic solvent for the oligomeric steroid ester is ethyl acetate or chloroform.

18. A therapeutic composition comprising an oligomeric steroid ester as defined in claim 1 and a pharmaceutically acceptable carrier therefor.

* * * * *